D. K. WILSON & C. L. TUTT.
VARIABLE SPEED TRANSMISSION MECHANISM.
APPLICATION FILED JULY 24, 1911.

1,051,475.

Patented Jan. 28, 1913.

3 SHEETS—SHEET 1.

Witnesses:
M. L. Jennings.
W. H. Brown

Inventors,
D. K. Wilson
& C. L. Tutt, by
G. C. Kennedy.
Attorney.

D. K. WILSON & C. L. TUTT.
VARIABLE SPEED TRANSMISSION MECHANISM.
APPLICATION FILED JULY 24, 1911.

1,051,475.

Patented Jan. 28, 1913.

3 SHEETS—SHEET 2.

Witnesses:
E. C. Jennings
W. H. Brown

Inventors,
D. K. Wilson & C. L. Tutt, by
G. C. Kennedy.
Attorney.

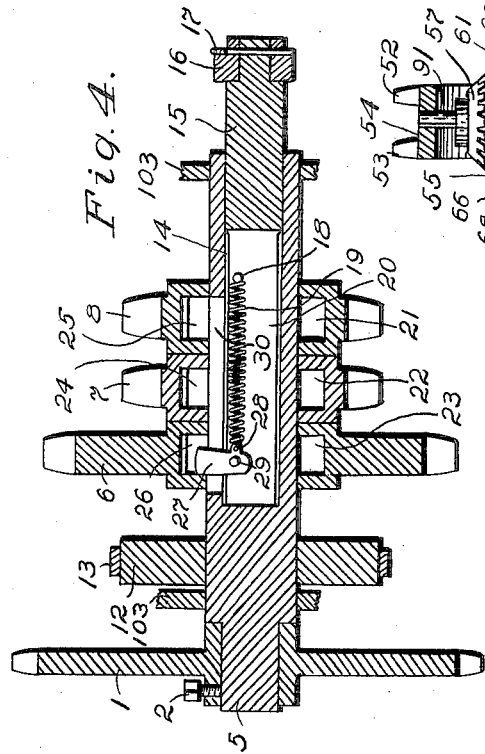

UNITED STATES PATENT OFFICE.

DALTON K. WILSON AND CHARLES L. TUTT, OF WATERLOO, IOWA, ASSIGNORS TO THE WILLIAM GALLOWAY COMPANY, OF WATERLOO, IOWA.

VARIABLE-SPEED-TRANSMISSION MECHANISM.

1,051,475.  Specification of Letters Patent.  Patented Jan. 28, 1913.

Application filed July 24, 1911. Serial No. 640,178.

*To all whom it may concern:*

Be it known that we, DALTON K. WILSON and CHARLES L. TUTT, citizens of the United States of America, and residents of Waterloo, Blackhawk county, Iowa, have invented certain new and useful Improvements in Variable-Speed-Transmission Mechanism, of which the following is a specification.

Figure 1:
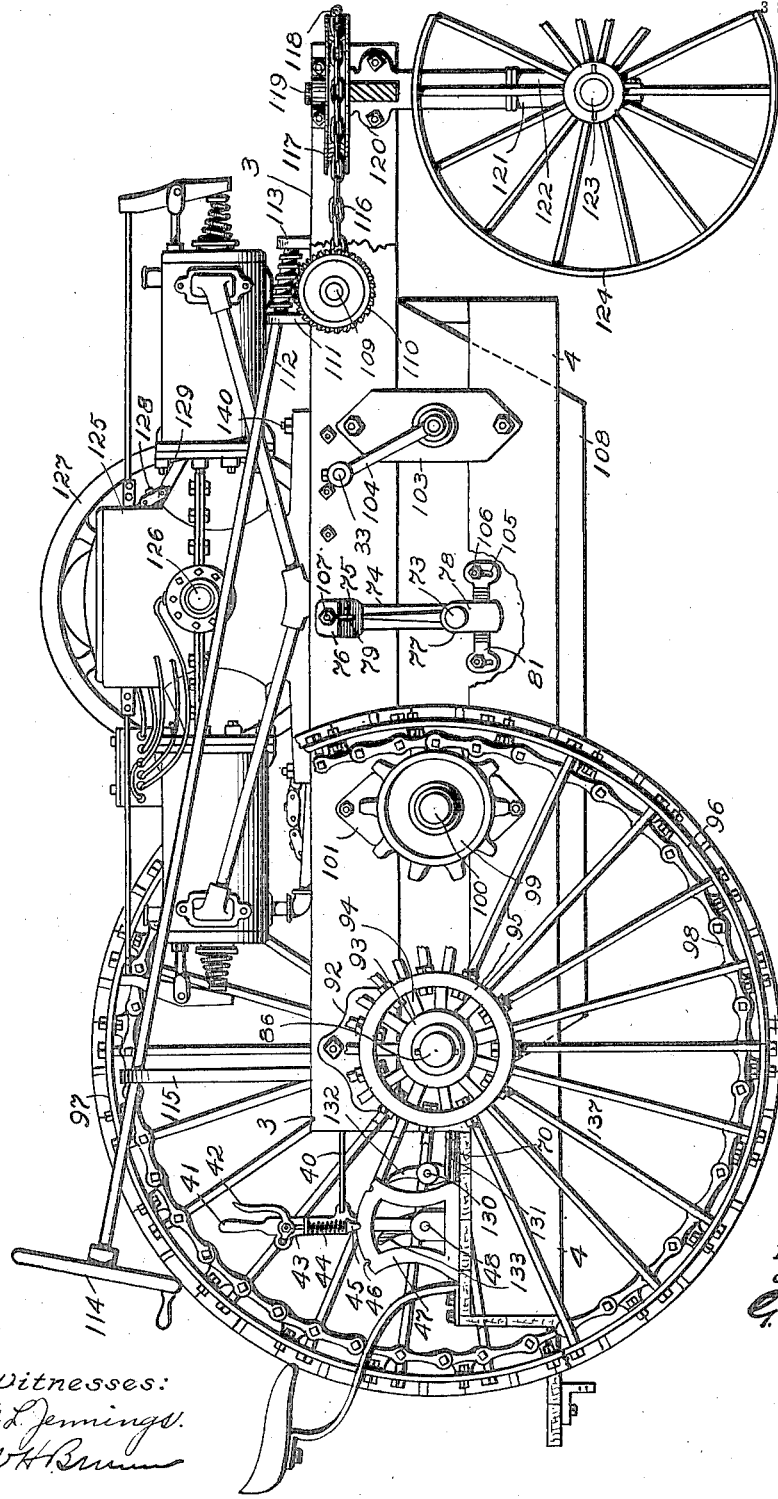
Figure 2:
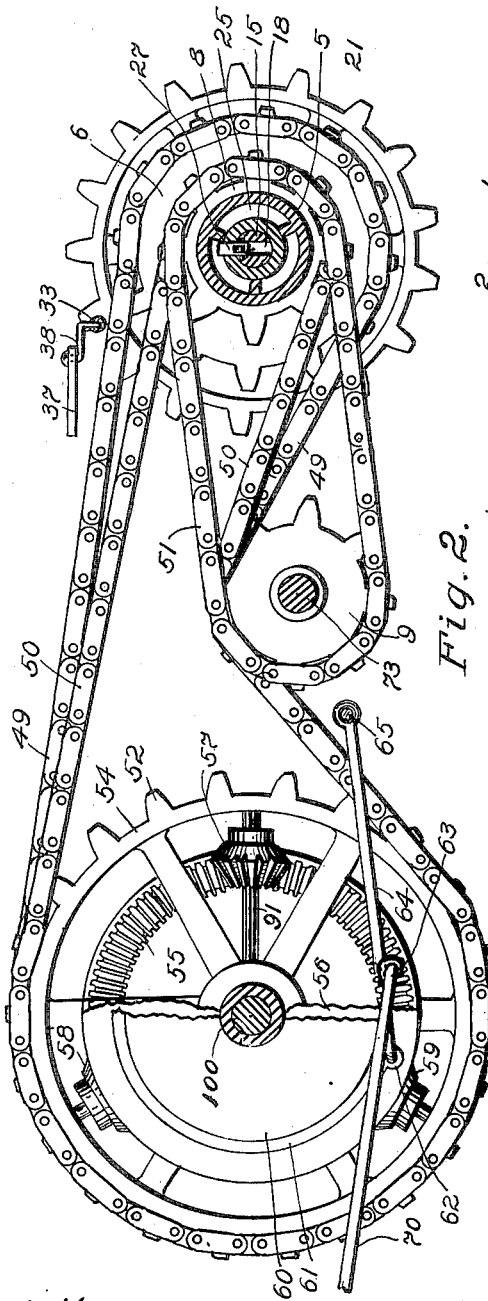
Figure 3:
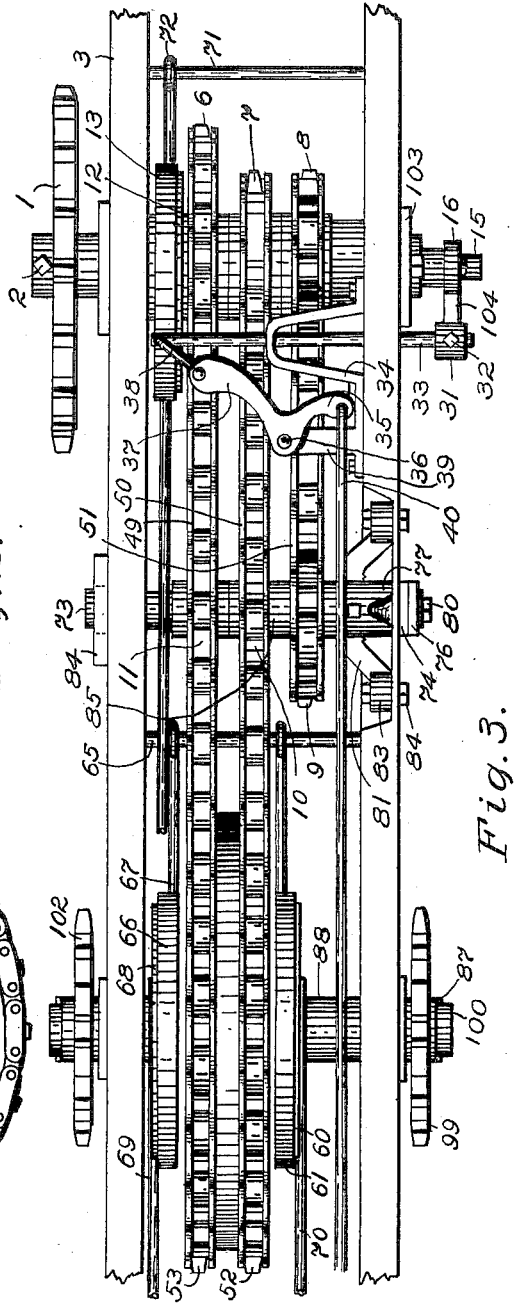

Our invention relates to variable speed transmission mechanism, and the object of our improvements is to provide a mechanism of minimum weight for the power transmitted, capable of easy and inexpensive repairs, positive in action, adapted for use in a tractor, and equipped with means for varying the speed of movement of the tractor as also permitting a reversal of such movement when necessary. This object we have accomplished by the mechanism which is hereinafter described and claimed, and which is illustrated in the accompanying drawings, in which:

Figure 1 is a right-hand side elevation of a tractor supplied with our improved variable speed transmission mechanism. Fig. 2 is an enlarged right-hand side elevation in detail of the variable speed transmission mechanism only. Fig. 3 is an upper plan view of the mechanism shown in Fig. 2, with other parts added. Fig. 4 is an enlarged longitudinal vertical axial section of the driving-shaft and of the independently movable driving-sprocket wheels mounted thereon, showing the means for selectively and non-rotatively interlocking any one of said sprockets to said shaft. Fig. 5 is a longitudinal vertical axial section of the driven sprocket-wheel, showing the differential gearing actuated thereby. Fig. 6 is an enlarged rear elevation of the adjustable upright supporting body containing a bearing for the right-hand end of the idler sprocket wheel shaft. Fig. 7 is a left-hand side elevation of the part shown in Fig. 6.
Fig. 8 is an upper plan view of the adjustable securing body for permitting horizontal adjustment of the idler sprocket wheel shaft. Fig. 9 is a rear elevation, enlarged, of the pedals used to tighten the band-brakes on the friction-drums fixed on the driven sprocket wheel shaft. Fig. 10 is a right-hand side elevation of the parts shown in Fig. 9.

Similar numerals of reference designate corresponding parts throughout the several views.

The frame of our improved mechanism is composed of upper and lower parallel channel-bars 3 and 4 connected together horizontally and spaced apart, and supported on the rear traction-wheels 96 and 97 and on the pivoted front carrying-wheels 124. The axle 123 of the wheels 124 is mounted in the connected paired castings 121 and 122, a vertical shaft 119 rising from said castings into a bearing 120 secured to the two upper beams 3 in front, and pivoted therein to rock horizontally with said wheels. In order to conveniently steer the tractor from the rear platform of the machine, we have adopted the following means for the purpose: The numeral 86 designates a shaft which has its ends supported by bearings in bracket-hangers 92 at the rear part of the frame. Upon the ends of this shaft are mounted the hubs 93, to which concentric rings 95 are fixedly connected by means of radiating bars 94, and the spokes 137 radiate from the rings to the rims of said wheels 96 and 97. Secured to the inner face of said rim of each wheel 96 and 97 and spaced apart therefrom are connected paired parallel and spaced apart bodies 98 which carry between them equidistantly spaced anti-friction rollers with which mesh the teeth in each case of a sprocket-wheel 99, the latter mounted on the end of a transverse shaft 100 rotatably, but having an offset connection (not shown) with the outer end of a sleeve 88 on said shaft. On the middle of the shaft 100 a large sprocket-wheel 54 is rotatably mounted, and said sprocket-wheel carries radial shafts 91 between its spokes on which are rotatable pinions 57, 58 and 59 which mesh with oppositely placed and facing bevel-gears 55 and 56 secured on the inner ends of the sleeves 88, such gearing forming a differential gearing. The wheel 54 is supplied with two rows of sprocket-teeth 52 and 53, spaced, apart, for a purpose to be presently described. Secured on the sleeves 88 are the drums 60 and 68, one on each side of said differential gearing, and carrying frictional band-brakes 61 and 66 respectively. The ends of said band-brakes have lugs 63 and 64 in orifices of which are pivoted crossed rods 64 and 70 on the right-hand side, and 67 and 69 on the left-hand side, the rods 64 and 67 being secured to a fixed transverse rod 65, while the rear ends of the rods 69 and 70 are pivoted to the lower projections 139 and 138 respectively of two pedals 134 and 133 which are pivotally mounted on the ends of a shaft 130 set to rock in bearings in uprights 135 on a base-plate secured to the rear platform by means of bolts 136.

At the forward part of the frame a transverse rotary shaft 5 is mounted in bearings 103, and a sprocket-wheel 1 is secured to its left-hand end by means of a set-screw 2. The said sprocket wheel is driven by a chain 129 which is passed operatively about a driving-sprocket wheel 128 mounted on the left-hand end of a crank-shaft 126 of a motor 125 supported on said frame and secured thereon by bolts 140, said motor having also a fly-wheel 127 on the shaft 126. Intermediate between the parallel upper frame bars three independently movable sprocket-wheels 6, 7 and 8 are loosely mounted on the shaft 5. The hubs of said wheels have concentric hollows 23, 22 and 21 respectively next said shaft 5, said hollows being each divided longitudinally by means of radial partitions 26, 24 and 25. To the left of the wheel 6, a friction-drum 12 is fixed and carries a band-brake 13. The ends of said band-brake have pivotal connections with rods 72 and 131 respectively, the rod 72 leading forward to a fixed transverse rod 71, while the rod 131 leads backward and is connected pivotally to the lower projection of a single pedal 132 pivoted at 130 to a support on the rear platform. The right-hand part of the shaft 5 is centrally hollowed out at 14, and a longitudinal slot 30 opens into said hollow and also communicates with the central hollows 23, 22 and 21 of said sprocket-wheels 6, 7 and 8 respectively. A cylindrical bar 15 is telescopically fitted within and longitudinally slidable within the hollow 14 of the shaft 5, and the left-hand part of said bar is so medially and longitudinally slotted as to furnish an axial slot 20 extending from side to side and open at the left-hand end. When the bar 15 is slid from side to side transversely, its slot 20 is made to open into the slot 30 in the sleeve 5 when the latter rotates past it. To a pin 18 set across the right-hand end of the slot 20 in said bar 15 is secured the right-hand end of a coiled tension-spring 19, the other end of the spring being connected to a lug 28 on a detent or pawl 27, the latter having pintles or studs 29 whereby it is pivotally mounted in said slot to the opposite parts of the said bar. The upper end of said detent 27 is the longest and adapted, when the slot 20 coincides with the slot 30 in the sleeve 5, to be projected by said spring into one of the hollows 23, 22 or 21 of the sprockets 6, 7 or 8, to engage one of the radial partitions therein, and thus form a connection between the shaft 5 and the particular sprocket with which it may be engaged, as shown in Fig. 2. When the bar 15 is slid to and fro in the hollow 14 of said shaft 5, the detent springs into the hollow in the desired sprocket-wheel according to the length of throw of said bar, the detent being forced back into the slots 30 and 20 when passing from one sprocket to another, and being forced entirely into the slot 20 when entirely withdrawn from said sprockets, so as to leave them free and loosely or idly mounted on said shaft 5. Since the detent 27 is mounted on pivots which rock in fixed seats on opposite sides of the slot 20, so that when the detent is extended from the slot its longitudinal medial line is at right angles to the slot, no rubbing movements of the parts which move by or pass the end of the detent can force it down again into the slot to disengage it from the sprocket against which it has been purposely shifted to engage.

The bar 15 is shifted by the following described means: A sleeve 16 is secured loosely on the right-hand end of the shaft 5 by means of a collar and split-key 17. From the sleeve 16 projects an arm 104 carrying a sleeve 31 which is secured to the right-hand end of a slidable rod 33 by a set-screw 32. The rod 33 slides transversely through an opening in one frame-bar 3 and a bracket 34. The numeral 35 designates a bell-crank lever medially pivoted at 36 to a bracket 39, and one end 37 of which has a link-connection 38 with the left-hand end of the rod 33. To the other part of said lever is pivoted the forward end of a shifting-rod 40, whose rear end (see Fig. 1) is pivoted to a medial lug on a hand-lever 41—43, the latter having its lower end pivoted at 48 to an upright secured to the rear platform, and integral with said upright is a rack-segment 47 provided with three hollows 46 to receive in turn a detent 45. The detent 45 is located on the lower end of a rod pivoted medially to a finger-piece 42, the latter pivoted at one end to the lever 43. The rod bearing said detent moves through an orifice in a lug on said lever, and a spring 44 engaged between the detent and said lug serves to keep the detent seated in whichever hollow 46 of said rack-segment 47 it may have been placed.

About midway between the transverse shafts 100 and 5 is located a shaft 73 which is set in a somewhat lower level, with its left-hand end mounted loosely in a bearing 84 to permit of some sidewise adjustment, while its right-hand end is seated in a bearing 77 which is supported at the lower end of an adjustable bracket 74. The bracket 74 is connected to the bars 3 and 4 by a bolt 107 at the top and by means of a fastening member 81 at the bottom, the latter secured to the lower bar 4 by means of bolts 106 through slots 105 in said member. The upper outer face of the part 74 is grooved horizontally at 75 to fit a corresponding plate 76 whereby vertical adjustment of the support 74 may be made to lift up the shaft 73 without liability of disengagement of said parts. The outer face of the part 81 is vertically grooved to permit of horizontal adjustment of said shaft. On the left-hand part of the shaft 73 is loosely mounted the hub of a sprocket-wheel 11, and adjacent said wheel to its right is loosely mounted a hub carrying two fixed sprocket-wheels 9 and 10. The sprocket wheels 9, 10 and 11 are located in line with the sprocket-wheels 8, 7 and 6 on the shaft 5, while the sprockets 10 and 11 only are in line with the sprocket teeth 52 and 53 respectively on the driven sprocket-wheel 54. A sprocket-chain 49 is passed about the wheel 6, over the sprocket-idler 11 and about the sprocket-teeth 53 on the wheel 54. A second chain 50 is passed about the wheel 7, then over the idler-wheel 10 and then about the sprocket-teeth 52 of the wheel 54. A third chain 51 is passed about the wheels 8 and 9 only.

The motor being in operation with the driving-shaft 5 in rotation, when the bar 15 is slid to the limit to the left the detent 27 is sprung into the hollow of the wheel 6 to engage its radial rib, and thus the wheel 6, its chain 49 and the driven-sprocket wheel 54 are put in rotation at high speed forward. When the bar 15 is shifted one place to the right the detent 27 disengages from the wheel 6 permitting it to run idle and engages the wheel 7. The wheel 7 being of smaller diameter drives the wheel 54 at slow speed, and when the detent 27 is again shifted one place to the right the wheel 7 is disengaged to run idle while the wheel 8 is non-rotatably interlocked with the shaft 5. The result is that the chain 51 rotates the idler wheel 9, and since the wheels 9 and 10 are rigidly connected, the chain 50 then drives the sprocket wheel 54 in a reversed direction. When the bar 15 is finally shifted to the right the detent 27 is disengaged from all said wheels 6, 7 and 8, and the action on the wheel 54 stops. The brakes above described are used in the usual way to act upon the moving parts to which they are applied. The use of sprocket-wheels and chains for transmitting power is thus effective, besides saving much weight as compared with gearing, and being easier to repair in case of breakage, and is particularly adapted to use in tractors which must move over broken ground.

Slight variations in construction in the device will come within the scope of the principles of our invention.

Having described our invention, what we claim as new, and desire to secure by Letters Patent, is:

1. In a variable speed transmission mechanism, the combination of a driven sprocket wheel, independently revoluble driving sprocket wheels, sprocket-chains operatively connecting two of said driving and said driven sprockets, a driving shaft, said driving sprockets being loosely mounted thereon, an idler sprocket wheel located between said driving and said driven sprockets and operatively engaged with one of said sprocket-chains, a sprocket-chain operatively connecting said idler sprocket to another of said driving sprockets, and means for selectively and non-rotatably interlocking a desired one of said driving sprockets with said driving shaft.

2. In a variable speed transmission mechanism, the combination of a driven sprocket wheel, independently revoluble driving sprocket wheels, sprocket-chains operatively connecting two of said driving and said driven sprockets, a driving shaft, said driving sprockets being loosely mounted thereon, an idler sprocket wheel located between said driving and said driven sprockets and operatively engaged with one of said sprocket-chains, a sprocket-chain operatively connecting said idler sprocket to another of said driving sprockets, and means telescopically fitting said driving shaft and adapted to be selectively shifted to non-rotatably interlock either of said driving sprockets therewith.

3. In a variable speed transmission mechanism, the combination of a driven sprocket wheel, independently revoluble driving sprocket wheels, sprocket-chains operatively connecting two of said driving and said driven sprockets, a driving shaft, said driving sprockets being loosely mounted thereon, an idler sprocket wheel located between said driving and said driven sprockets and operatively engaged with one of said sprocket-chains, a sprocket-chain operatively connecting said idler sprocket to another of said driving sprockets, and means telescopically fitting said driving shaft and adapted to be shifted to selectively and non-rotatably interlock either of said driving sprockets therewith or to be withdrawn from said sprockets to permit them to rotate idly on said shaft.

4. In a variable speed transmission mechanism, the combination of a driven sprocket wheel, independently revoluble driving sprocket wheels, sprocket-chains operatively connecting two of said driving and said driven sprockets, a driving shaft, said driving sprockets being loosely mounted thereon, an idler sprocket wheel located between said driving and said driven sprockets and operatively engaged with one of said sprocket-chains, a sprocket-chain operatively connecting said idler sprocket to another of said driving sprockets, and yieldable resilient means adapted to be actuated to selectively and non-rotatably interlock either of said driving sprockets to said driving shaft, and adapted to be moved to become disengaged from all said sprockets.

5. In a variable speed transmission mechanism, the combination of a driven sprocket wheel, independently revoluble driving sprocket wheels, sprocket-chains operatively connecting two of said driving and said driven sprockets, a driving shaft, said driving sprockets being loosely mounted thereon, an idler sprocket wheel located between said driving and said driven sprockets and operatively engaged with one of said sprocket-chains, a sprocket-chain operatively connecting said idler sprocket to another of said driving sprockets, means for selectively and non-rotatably interlocking a desired one of said driving sprockets with said driving shaft, and means for regulating the tension of said sprocket-chains.

6. In a variable speed transmission mechanism, the combination of a driven sprocket wheel, independently revoluble driving sprocket wheels, sprocket-chains operatively connecting two of said driving and said driven sprockets, a driving shaft, said driving sprockets being loosely mounted thereon, said driving shaft being hollow and having a longitudinal slot in one side in communication with said hollow, an axially shiftable longitudinally slotted body telescopically fitted within the hollow of said shaft, an engaging-device resiliently connected to the interior part of said slotted body and adapted to project itself therefrom to engage selectively either of said driving sprockets when said body is shifted in the hollow of said driving shaft to non-rotatably interlock the engaged sprocket detachably with said shaft, said engaging-device having oppositely projecting pintles seated in bearing-openings in the walls of the slot of said slotted body, said engaging-device being of elongated form with said pintles located near its inner end, said resilient means being so connected to said engaging-device as to normally hold it with its longer dimension at a right angle to said driving-shaft with its medial longitudinal line passing through said pintles, said pintles being so located as to prevent recession of the engaging-device into the slot when pressure is applied to its outer end at a right-angle to said driving-shaft.

7. In a variable speed transmission mechanism, the combination of a driven sprocket wheel, independently revoluble driving sprocket wheels, sprocket-chains operatively connecting two of said driving and said driven sprockets, a driving shaft, said driving sprockets being loosely mounted thereon, an idler sprocket wheel located between said driving and said driven sprockets and operatively engaged with one of said sprocket-chains, a sprocket-chain operatively connecting said idler sprocket to another of said driving sprockets, said driving shaft being hollow and having a longitudinal slot in one side in communication with said hollow, an axially shiftable longitudinally slotted body telescopically fitted within the hollow of said shaft, an engaging-device resiliently connected to the interior part of said slotted body and adapted to project itself therefrom to engage selectively either of said driving sprockets when said body is shifted in the hollow of said driving shaft to non-rotatably interlock the engaged sprocket detachably with said shaft.

8. In a variable speed transmission mechanism, a driven sprocket wheel provided with two rows of sprocket teeth, independently revoluble driving sprocket wheels, a driving shaft, said driving sprockets being loosely mounted thereon, an idler sprocket wheel located between said driving and said driven sprockets and provided with two sets of sprocket teeth, a sprocket-chain operatively connecting one of said driving sprockets with one row of teeth on said driven sprocket, a sprocket-chain operatively connecting another of said driving sprockets with one set of teeth on said idler sprocket and with the other row of teeth on said driven sprocket, and a third sprocket-chain operatively connecting a third of said driving sprockets with the second set of teeth on said idler sprocket, and means for selectively and non-rotatably interlocking either of said driving sprockets with said driving shaft.

9. In a variable speed transmission mechanism, a driven sprocket wheel provided with two rows of sprocket teeth, independently revoluble driving sprocket wheels, a driving shaft, said driving sprockets being loosely mounted thereon, two idler sprocket wheels located between said driving and said driven sprockets and one of them being provided with two sets of teeth, a sprocket-chain operatively connecting the largest of said driving sprockets with one row of teeth on said driven sprocket and engaging the upper teeth of the single row idler sprocket, a second sprocket-chain operatively connecting a second smaller driving sprocket wheel and the second row of teeth on said driven sprocket wheel and also engaging the upper teeth of one of the sets of teeth on the two rowed idler sprocket wheel, and a third sprocket-chain operatively connecting a third of said driving sprockets with the second set of teeth on said two rowed idler sprocket wheel, and means for selectively and non-rotatably interlocking either of said driving sprockets with said driving shaft.

10. In a variable speed transmission mechanism, a driven sprocket wheel provided with two rows of teeth, a brake operatively connected with said driven sprocket, independently revoluble driving sprocket wheels, a driving shaft, said driving sprockets being loosely mounted thereon, a brake operatively connected with said driving shaft, idler sprocket wheels located on the same shaft loosely, one of said idlers having two sets of sprocket teeth, a sprocket-chain operatively connecting the largest of said driving sprockets with one row of teeth on said driven sprocket and also engaging said single rowed idler sprocket, a sprocket-chain operatively engaging a smaller one of said driving sprockets and the second row of teeth on said driven sprocket also intermeshing with one set of teeth on said two rowed idler sprocket, another sprocket-chain operatively connecting a third driving sprocket with the second row of teeth on said two rowed idler sprocket, and means telescopically fitting said driving shaft and adapted to be selectively shifted to non-rotatably interlock either of said driving sprockets therewith.

11. In a variable speed transmission mechanism, the combination of a driven sprocket wheel, independently revoluble driving sprocket wheels of which one is of larger diameter than the others, a driving shaft, said driving sprockets being loosely mounted thereon, idler sprocket wheels of which one has two rows of teeth located intermediately between said driving and driven sprocket wheels, a sprocket-chain operatively connecting the larger of said driving sprockets with said single rowed idler and with one row of teeth on said driven sprocket, a sprocket-chain operatively connecting another of said driving sprockets with one row of teeth on said two rowed idler and with the second row of teeth on said driven sprocket, a third sprocket-chain operatively connecting the third driving sprocket with the second row of teeth on said two-rowed idler, said driving shaft being hollowed and having a longitudinal slot in one side affording access to said hollow, an axially shiftable longitudinally slotted body telescopically fitted within the hollow of said shaft, an engaging-device resiliently connected to the interior part of said slotted body and adapted to project itself therefrom to be engaged selectively with either of said driving sprockets through the slot in said shaft when said body is shifted appropriately, an arm connected to one end of said shiftable body, a slide-bar secured to said arm, bearings for said slide-bar, a medially-pivoted bell-crank lever having one end linked to said slide-bar, an adjustable pivoted hand-lever, and a connecting-rod pivotally connected between said hand-lever and the other end of said bell-crank lever.

Signed at Waterloo, Iowa, this 6th day of July, 1911.

DALTON K. WILSON.
CHARLES L. TUTT.

Witnesses:
W. H. BRUNN,
G. C. KENNEDY.